March 31, 1931.  B. T. HORSFIELD  1,798,261
PURIFYING ALUMINA
Filed Dec. 4, 1925  2 Sheets-Sheet 1
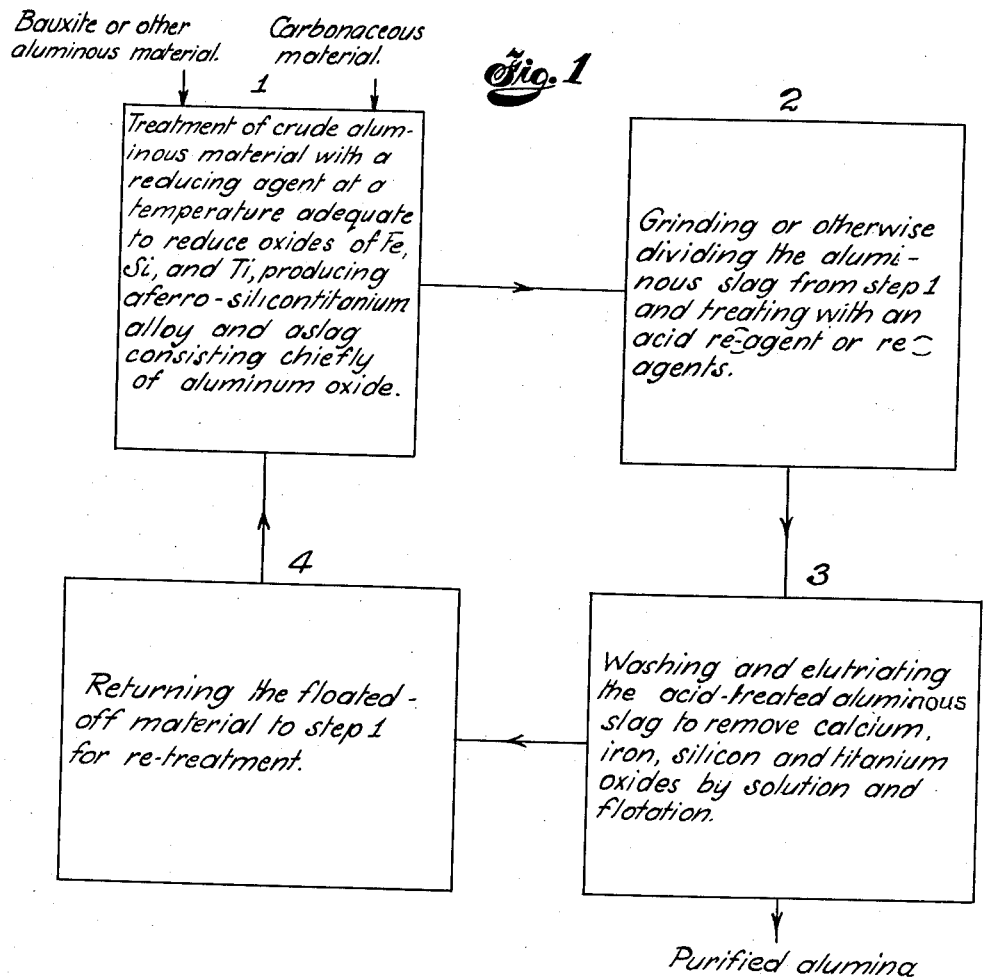
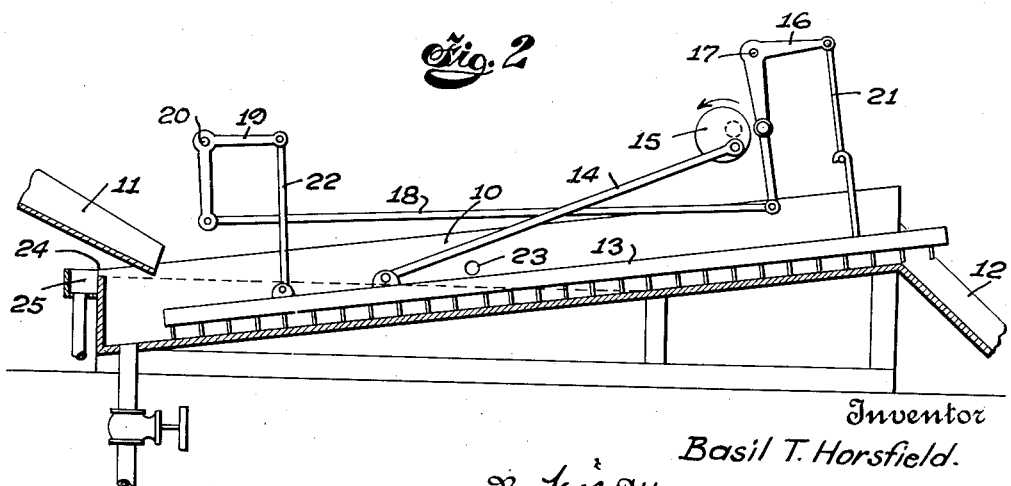
Inventor
Basil T. Horsfield.
By his Attorneys
Cooper, Kerr & Dunham

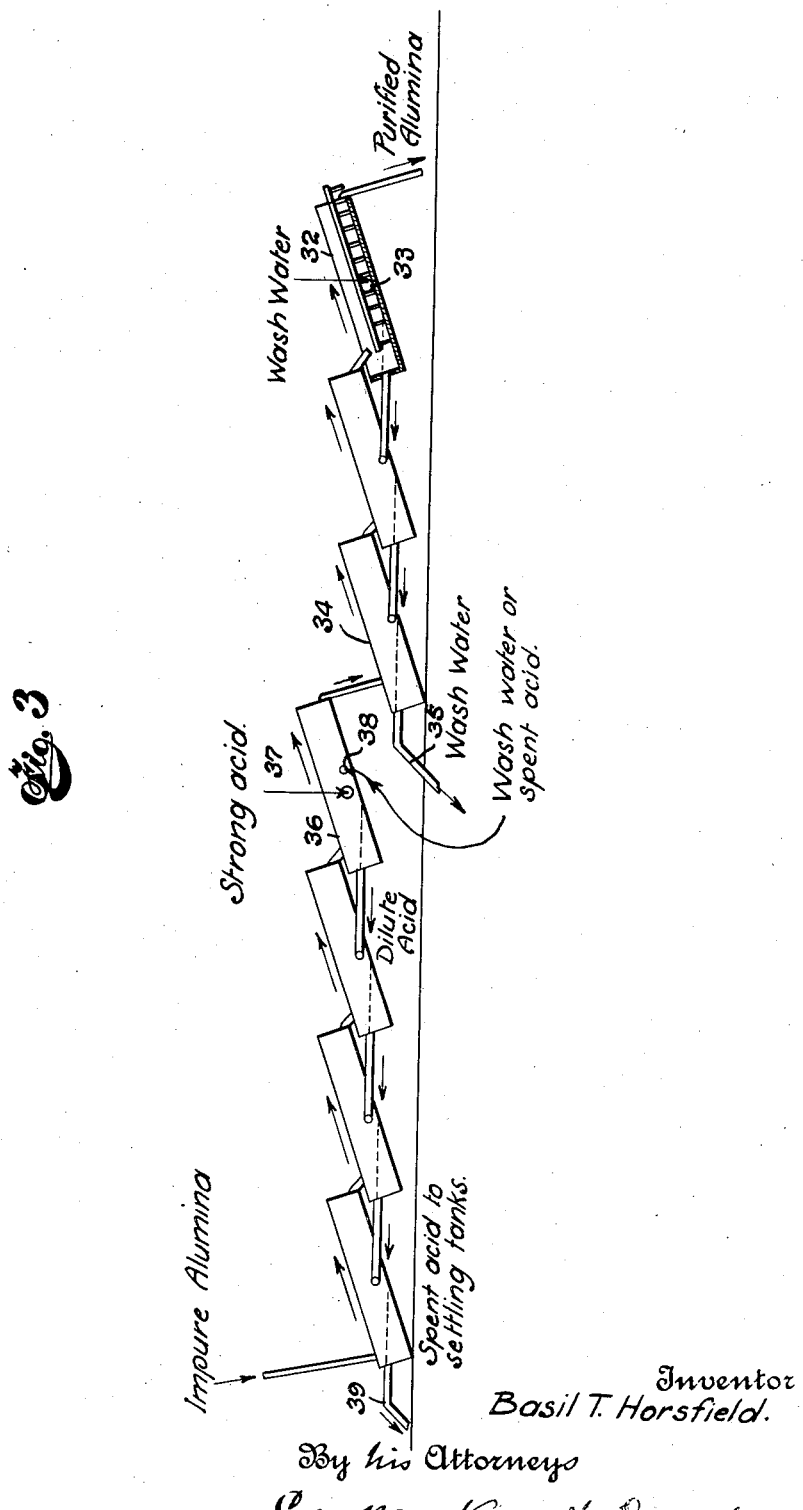

Patented Mar. 31, 1931

1,798,261

UNITED STATES PATENT OFFICE

BASIL T. HORSFIELD, OF BADIN, NORTH CAROLINA, ASSIGNOR TO ALUMINUM COMPANY OF AMERICA, OF PITTSBURGH, PENNSYLVANIA, A CORPORATION OF PENNSYLVANIA

PURIFYING ALUMINA

Application filed December 4, 1925. Serial No. 73,094.

In methods heretofore proposed for obtaining alumina from bauxite and other aluminous materials by reduction of the associated oxide impurities with a carbonaceous reducing agent in an electric furnace, difficulty has been experienced in decreasing the content of iron, silicon and titanium oxides to an amount much below about 0.5 per cent, and on account of traces of lime in the original bauxite and in the ash of the coke or other reducing agent the alumina tapped from the furnace usually contains calcium oxide in amount between about 0.2 and 0.7 per cent. Also, traces of carbide are often found in the alumina. These impurities are usually objectionable when the alumina is to be used for the manufacture of aluminum by electrolytic reduction in a bath of fused fluorides, as in the well known Hall or Heroult process, since the iron, silicon and titanium oxides are reduced also and the corresponding metals are deposited with the aluminum, thus contaminating the latter, and the calcium oxide is converted into flouride, which gradually accumulates in the bath, sometimes building up to an amount seriously objectionable in the electrolytic process.

The great care and attention required in carrying out the above mentioned purification method in order to keep down the impurity-content of the alumina to a point which will make the alumina uniformly pure enough for electrolytic reduction has led me to devise my present invention, which has for its chief object to provide a simple, cheap and reliable method of removing all or substantially all of the calcium oxide and at least a substantial part, usually the major portion, of the residual oxides of iron, silicon and titanium, together with carbide. To this and other ends the invention comprises the novel steps and combinations hereinafter disclosed.

In carrying out my invention in the preferred manner the alumina to be treated is first ground or otherwise finely divided, preferably to a size permitting all the particles to pass through a screen having eighty or eighty-five meshes to the inch. This preliminary grinding may be effected by any suitable means. If the alumina is solidified in large masses the latter may be rough-ground by a jaw or gyratory crusher or by crushing rolls, followed by fine-grinding in a ball or tube mill. If the alumina is in the hollow globular form resulting from the blowing treatment described hereinafter, the rough grinding is usually unnecessary, and in fact I have obtained good results without any grinding at all.

I have discovered that in this finely divided alumina the impurities, or at least the greater part, are in a form in which they are readily susceptible to attack by acid reagents, while substantially all the alumina is in a form which is not so attacked. In other words, the impurities seem to be segregated in the solidified alumina in such a way that the grinding exposes them quite completely, and apparently leaves them associated or combined only with each other or with very small amounts of alumina, or both, in forms in which they are readily attacked by acid reagents. It would appear probable that in the course of solidification of the molten alumina the greater portion of the latter crystallizes out in the form of pure or substantially pure $Al_2O_3$ before the temperature has fallen low enough to permit the impurity compounds of lower freezing point to begin to solidify, and that consequently these still liquid impurities are segregated between the grains or crystals of alumina, where they form a more brittle, weaker and softer matrix. Therefore when the fused alumina is crushed and ground the harder particles of the pure $Al_2O_3$ resist the grinding to a much greater extent than does the softer matrix; with the result that the impurities are, at least for the most part, mechanically separated from and ground to a much finer state than the main body of alumina. While this explanation appears reasonable to me and in accordance with the facts I do not limit myself to it nor do I say that it is the only factor involved, but my invention rests on the fact that the pulverized or finely divided alumina can be almost if not wholly freed of lime, and largely freed of the other impurities mentioned above, by leaching or equivalent treatment with acid reagents, as for example sulfuric, sulfurous, hydrochloric, or hydrofluoric acid, or sodium or potassium acid sulfate. Substantially all of the alumina is recovered, though a small amount of alumina, say about 2 per cent or less of the material treated, may be lost in the process, either by being dissolved or by being washed away during the elutriation hereinafter described.

It has been found that with any of the above named acid reagents, except perhaps hydrofluoric acid, some of the silica and titanium oxides are not removed in the form of a true solution but apparently are precipitated, or remain insoluble, in the leaching operation in the form of an extremely finely divided and usually more or less gelatinous precipitate which may contain partially hydrated silica and basic titanium oxide compounds. If the pulverized material after the acid treatment is elutriated, that is, washed with water so as to remove soluble material, in any suitable apparatus in which the material is gently agitated in a slowly moving stream of water and opportunity is given for the floating off of the very finely divided or gelatinous material, it is found that the gelatinous or very fine material thus mechanically eliminated contains a considerable amount, up to several per cent or more, of the oxides of silicon and titanium which have been removed from the main body of alumina, but it appears to consist mainly of alumina in a state of extremely fine subdivision. If it is desired to recover this alumina, the material bearing it can be separated from the wash-water by filtration or settling and then returned to the electric furnace for re-treatment.

While I have found that the lime and a considerable proportion of the iron, silicon and titanium oxides can be removed by treatment with the above-mentioned acid reagents, followed by simple washing without elutriation, I prefer to employ both washing and elutriation, usually combining the two in one step, so as to produce an alumina of maximum purity.

Other acid-soluble impurities, such as oxides of sodium and magnesium, will be removed, if they are present, along with the oxides already mentioned, but they are not ordinarily found in any material amount in alumina which has been subjected to the purification treatment in the electric furnace.

A very effective way of carrying out the treatment is to pass the alumina and the acid reagent in counter-current relation through a suitable vessel or series of vessels, so that as the acid reagent becomes weaker it meets alumina of greater impurity content, and the purest alumina is treated with the strongest acid. The process can thus be made continuous. A convenient means of accomplishing this result is to employ a series of devices commonly known as Dorr classifiers, in which the alumina is introduced into the first one, where it meets the nearly spent acid. Assuming that seven classifiers are used in series, the alumina being introduced in the first and wash water in the seventh, the alumina would be raked from the first to the seventh, while the water flows in the opposite direction. The necessary amount of the strong acid, for example, sulfuric acid, would be continuously introduced in the fourth, for example, thus delivering from the seventh the leached and washed alumina and overflowing from the first the spent acid made from the wash water and carrying in suspension the finely divided impurities as described.

Another convenient method is to provide a series of flat trays with rakes, charge these with a layer of alumina about six inches deep, add enough spent acid from the previous digestion to make a thin mud (about 100 gallons per thousand pounds of alumina), agitate and digest at room temperature for about four hours, and permit the alumina to settle out. The spent acid is then run off to settling tanks to collect fine suspended alumina, fresh diluted acid is added to the alumina, and the digestion continued for about sixteen hours longer. At the end of this time the alumina is again separated from the acid liquor by sedimentation, the acid liquor run off for use in the next leaching, and the alumina washed free of acid, for example, by means of a series of three Dorr classifiers. In either case it may be subsequently dried in a rotary kiln before being used in the manufacture of aluminum.

In the accompanying drawing,

Fig. 1 is a flow-sheet showing the procedure outlined above, beginning with the treatment of the crude bauxite or other aluminous material in the electric furnace to remove most of the associated oxide impurities, and ending with highly pure alumina suitable for electrolytic reduction to metallic aluminum.

Fig. 2 illustrates diagrammatically, partly in longitudinal section, a well known type of apparatus which may be used for leaching, elutriating and washing the alumina.

Fig. 3 illustrates a series of devices such as shown in Fig. 2, arranged for operation on the counter-current principle.

The "classifier" shown in Fig. 2 comprises an elongated inclined receptacle or trough 10, having at its lower end a supply chute 11 and at its higher end a discharge chute 12 for the alumina treated. In the trough is a rake 13 connected by a link 14 to an eccentric crank disk 15 for reciprocation thereby. The crank disk also acts as a cam to rock the bell crank lever 16, fulcrumed at 17 and connected by link 18 to bell crank lever 19 fulcrumed at 20. The rake is suspended from the bell crank levers by links 21, 22. Liquid is supplied through an opening 23. As the rake is retracted by the cam 15, the latter rocks the bell crank levers and thereby lifts the rake out of the alumina on the bottom of the trough. The rake is then advanced, lowered into the alumina, and retracted again. This cycle, repeated at a suitable rate, advances the alumina up the inclined bottom, while the liquid, the surface of which is indicated by the dotted line, flows in the opposite direction and overflows at 24 into the trough 25.

In the step indicated first in Fig. 1, the reduction of iron, silicon and titanium oxides may be effected by fusing the bauxite, clay or other alumina-bearing material in the presence of coke or other suitable reducing agent, in an electric furnace. In this treatment some of the alumina ($Al_2O_3$) is usually reduced, so that the iron-silicon-titanium alloy which collects at the bottom of the furnace may contain more or less aluminum also. The unreduced material collects on this alloy in the form of slag, which should contain not less than about 95 per cent of alumina. The slag is tapped off from time to time and allowed to solidify, after which it is divided to the desired degree of fineness, say to 80-mesh or 85-mesh size; or as it is tapped from the furnace it is converted into small hollow globules by blowing with a jet of air or steam, as described in my copending application Serial No. 12,617, filed March 2, 1925. This blowing process with a gaseous oxidizing agent is advantageous in that it burns substantially all the excess carbon in the alumina, and also gets rid of considerable iron oxide by volatilization thereof. The alumina produced in this globular form may be finely ground.

The finely divided alumina is now leached with an acid reagent, such as mentioned above, then washed and elutriated, the impurity-bearing solid or gelatinous material thus removed being separated from the liquid in any convenient way and returned to the electric furnace. The washed alumina thus obtained can be charged (after drying) into the electrolytic cells for reduction to metallic aluminum.

The leaching, elutriation and washing are preferably effected by means of several devices of the kind illustrated in Fig. 2, arranged in series as in Fig. 3, which shows seven of such devices. The alumina is introduced into the first, designated by the numeral 31 and falls by gravity into the second, thence into the third, and so on. Wash water introduced into the last device, 32, by means of pipe 33, overflows into the sixth, and from the sixth to the fifth, designated by 34, and is discharged from the fifth through pipe 35. Sulfuric acid is introduced into the fourth device, 36, by pipe 37, and water is introduced into the same device by pipe 38 to dilute the acid. From the fourth classifier the acid flows to the next in order (toward the left), and so on to the first classifier, 31. The alumina introduced into the classifier 31 is thus subjected first to the action of spent acid and then to stronger and stronger acid until the minimum dilution is encountered in classifier 36. From the first the spent acid is discharged through pipe 39. The wash water discharged from classifier 34 contains the acid washed out of the alumina passed through the last three classifiers. The spent acid from the first classifier, 31, carries with it the suspended insolubles, and separation of the latter is effected by filtering, or settling and decantation, or in any other convenient and suitable manner. The water supplied to classifier 38 to dilute the acid may be fresh water, but is preferably wash water from classifier 34, or spent acid from classifier 31 (after separation of the solids therefrom), or both. In any case I prefer to adjust the supply of strong acid and of diluting liquid to give acid of about ten per cent strength in classifier 36. I find one gallon of 10 per cent acid to fifteen pounds of alumina to be a suitable proportion in the fourth classifier. Passing the aluminia through the series of seven classifiers at the rate of about four tons per hour while supplying three hundred and fifty to four hundred gallons of 10 per cent acid per hour, gives good results. The wash water can be supplied at the rate of five hundred gallons per ton of alumina. In this way I can treat ninety-six tons of alumina per day and reduce the oxide impurity content from about 1.5 per cent to less than 0.3 per cent.

The following examples illustrate the use of my process with a variety of acid reagents. It will be noted that the process is not limited to a single treatment with the acid reagent or reagents, and that where more than one such treatment is employed I may use different reagents in the successive treatments. For instance a preliminary treatment with sulfuric or hydrochloric acid or sulfur dioxide may be advantageously employed to remove all of the lime and more or less of the other impurities, and in a subsequent treatment the reagent may include hydrofluoric acid or other material that might form insoluble compounds with the lime or that might be too expensive to be economically used in the first treatment.

*Example A.*—1000 pounds of ground aluminum oxide slag treated with 55 gallons of sulfuric acid of 10 per cent strength in a washing and elutriating apparatus having a level settling floor. Agitation was effected by means of wooden rakes working flat on the floor. Digestion for 20 hours at room temperature. Samples for analysis were washed by decantation with cold water. The aluminum oxide content of the untreated slag was 98.87 per cent, and after the digestion it was found to be 99.75 per cent. The digestion removed 64.8 per cent of the $SiO_2$, 62.5 per cent of the $Fe_2O_3$, 64.3 per cent of the $TiO_2$, and all or substantially all of the CaO.

*Example B.*—Sulfurous acid solution was circulated for 6 days through 7000 pounds of slag. This treatment removed 38.1 per cent of the $SiO_2$, 50 per cent of the $Fe_2O_3$, 44 per cent of the $TiO_2$, and all of the CaO.

*Example C.*—A mixture of 7400 pounds of slag and 800 pounds common salt was moistened with water to about the consistency of foundry sand. This moistened slag was placed in a tank and $SO_2$ gas passed into the mixture until thorough saturation was attained. It was allowed to stand 5 days, the temperature being increased after saturation with the gas from 26° C. to about 70° C. After 5 days, washing was commenced, using sulfurous acid solution and upward circulation. This was continued for 48 hours. The acid solution was then drained off and the charge washed with 5 per cent sulfuric acid solution by downward percolation. The sulfuric acid remained in contact with the charge for 4 days. This treatment removed 26.7 per cent of $SiO_2$, 22.6 per cent of the $Fe_2O_3$, 40.8 per cent of the $TiO_2$, all of the CaO, and brought the $Al_2O_3$ content from 98.69 per cent to 99.48 per cent.

*Example D.*—4100 pounds of slag containing 14 per cent water was charged into a kiln and gassed with $SO_2$ for 12 hours. During this time 660 pounds of $SO_2$ gas was used. The samples for analysis were washed with 5 per cent HCl, four washings of 20 minutes duration being used. This treatment increased the alumina content from 98.33 per cent to 99.66 per cent and removed 71.5 per cent of the $SiO_2$, 83.6 per cent of the $Fe_2O_3$, 50 per cent of the $TiO_2$, and all of the CaO.

*Example E.*—The treated slag from Example D was treated 36 hours longer with $SO_2$ gas followed by 24 hours gassing with chlorine. This treatment increased the alumina content to 99.7 per cent as compared with the raw slag. There was removed 71.5 per cent of the $SiO_2$, 83.6 per cent of the $Fe_2O_3$, 63.3 per cent of the $TiO_2$, and 100 per cent of the CaO.

*Example F.*—200 pounds of slag was leached 4 days with a solution containing 17.4 per cent HCl. After treatment the charge was washed with filtered water. This leaching effected the removal of 20 per cent of the $SiO_2$, 90.6 per cent of the $Fe_2O_3$, 65.3 per cent of the $TiO_2$, and all of the CaO.

*Example G.*—2000 pounds of slag containing 14 per cent water was charged into a kiln equipped with gas tight heads and gassed 24 hours with chlorine. The samples for analysis were washed 4 times with 5 per cent HCl solution, each washing being of 20 minutes duration. This treatment removed 60 per cent of the $SiO_2$, 44.5 per cent of the $Fe_2O_3$, and 32.1 per cent of the $TiO_2$, and all or substantially all of the CaO was also removed.

*Example H.*—100 pounds of slag plus 5 pounds of common salt was treated with 12 gallons of 6.3 per cent sulfuric acid solution. After 6 hours the acid was decanted and fresh solution added. The total leaching time was 13 hours. This treatment removed 57.1 per cent of the $SiO_2$, 50 per cent of the $Fe_2O_3$, 44.5 per cent of the $TiO_2$ and all of the CaO.

*Example I.*—100 pounds of slag was treated with 15 gallons of sulfurous acid solution containing 51 grams $SO_2$ per 1000 cc. After 4 hours the acid solution was removed and an equal amount of fresh acid added and allowed to react for 10 hours. By this treatment there was removed 33.3 per cent of the $SiO_2$, 50 per cent of the $Fe_2O_3$, 37 per cent of the $TiO_2$, and all of the CaO.

*Example J.*—Using HCl of 10 per cent strength, removed after 8 hours and treatment continued with fresh solution for 20 hours longer. This treatment removed 81.5 per cent of the $SiO_2$, 81.0 per cent of the $Fe_2O_3$, 66.7 per cent of the $TiO_2$, and all of the CaO.

*Example K.*—Slag first moistened with HF, then with 1:1 HCl, and warmed. The solution was removed, and 1:5 HCl added, and allowed to stand 20 minutes. Total time of treatment, 2 hours. Impurities removed: $SiO_2$ 93.8 per cent, $Fe_2O_3$ 61.5 per cent, $TiO_2$ 50.0 per cent, all the CaO.

*Example L.*—Slag treated with strong aqueous solution of $H_2SO_3$. After 96 hours the impurity removal was $SiO_2$ 90.0 per cent, $Fe_2O_3$ 93 per cent, $TiO_2$ 58.4 per cent, all the CaO.

*Example M.*—Slag agitated with HCl of 5 per cent strength saturated with $SO_2$, for 144 hours. Impurity removal: $SiO_2$ 53.0 per cent, $Fe_2O_3$ 100 per cent, $TiO_2$ 51.9 per cent, all the CaO.

As previously stated, the molten aluminum oxide can be converted into small hollow globules by blowing a stream of the slag, preferably as it issues from the furnace, with air, steam, or other gaseous fluid, preferably of an oxidizing nature. In size these globules may be as small as the particles of fine sand, and may be much larger, depending chiefly on the fluidity of the aluminum oxide and the velocity of the blowing jet. With the aluminum oxide well above the melting point so as to be adequately fluid, and blowing with air or steam under a pressure of a hundred to a hundred and fifty pounds per square inch the hollow granules range in size from very fine sand to diameters of an eighth of an inch or more, with walls about one one-hundredth of an inch, or less, in the thickness. In color the granules are white, showing practically complete absence of free carbon, even though the unblown slag contains so much carbon as to be black when solidified.

The aluminum oxide thus converted into hollow globules can be effectively purified in that form by my acid treatment. Using sulfuric acid of 10 per cent strength for treating blown slag the CaO was all removed in fifteen days time and the $SiO_2$, $Fe_2O_3$, and $TiO_2$ were decreased from .23, .23 and .28 per cent to .05, .12 and .12 per cent, respectively. Apparently the thin walls of the globules permit the acid to penetrate them and dissolve the impurities even though the globules are not ground or even crushed.

I am aware that the oxides of iron, titanium, silicon and calcium in the alumina may be present in combination with each other or with aluminum, as for example, in the form of calcium aluminate, calcium silicate, etc., but they are, in general, combined with oxygen, and in the absence of definite knowledge as to what the compounds may be in every case, it is convenient to refer to them as oxides.

As the leaching reagent I prefer sulfuric acid, because of its reasonable cost, ready availability, and convenience in handling.

When aluminum carbide is present in the alumina it is removed by reaction with the dilute acid, forming aluminum sulfate, for example, in solution, and a hydrocarbon gas which escapes in that form.

It is to be understood that the invention is not limited to the specific procedure herein described but can be carried out in other ways without departure from its spirit.

I claim—

1. Process of further purifying alumina which has been partially purified in the molten state, comprising blowing the alumina to convert and solidify the same into small hollow globules, and without further purifying treatment at high temperature leaching the blown alumina with an acid reagent.

2. Process of purifying alumina, comprising fusing the alumina, blowing the same into the form of small hollow globules, grinding the globules, and removing impurities from the ground alumina by leaching with an acid reagent.

3. In a process of obtaining substantially pure alumina from alumina partially purified by reaction of a reducing agent at high temperature with associated oxide impurities such as iron, titanium, silicon, and calcium oxides, dividing the partially purified alumina, passing the divided alumina countercurrent through a stream of acid reagent of gradually increasing strength whereby more or less of unreduced oxide impurities are dissolved, and then passing the alumina countercurrent through a stream of wash-water containing acid in amount decreasing to zero, to remove dissolved and undissolved impurities.

4. In a process of obtaining substantially pure alumina from alumina partially purified by reduction of associated oxide impurities such as iron, titanium, silicon, and calcium oxides, dividing the partially purified alumina, passing the alumina through a series of vessels, introducing washwater into the last vessel, passing the wash-water countercurrent to an intermediate vessel and withdrawing it therefrom, introducing acid into another intermediate vessel in advance of the first named, introducing wash-water from the first named intermediate vessel into the said other intermediate vessel to dilute the acid therein, and passing the dilute acid thence through the other vessels countercurrent to the alumina.

In testimony whereof I hereto affix my signature.

BASIL T. HORSFIELD.